Figure 1:
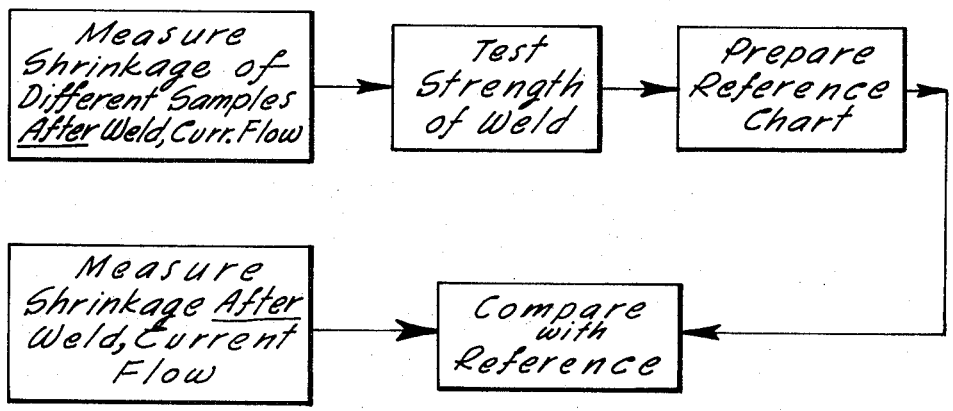

United States Patent

[11] 3,632,956

[72] Inventor Klaus Herbst
 Solingen-Ohligs, Germany
[21] Appl. No. 27,415
[22] Filed Apr. 10, 1970
[45] Patented Jan. 4, 1972
[73] Assignee Kronprinz Aktiengesellschaft
 Solingen-Ohligs, Germany
[32] Priority Apr. 14, 1969
[33] Germany
[31] P 19 19 538.1

[54] METHOD FOR SUPERVISING SPOT WELDING
 3 Claims, 2 Drawing Figs.
[52] U.S. Cl. .................................................. 219/109
[51] Int. Cl. ................................................... B23k 11/24
[50] Field of Search ..................................... 219/109,
 110, 86, 117

[56] References Cited
UNITED STATES PATENTS
3,449,541 6/1969 Wilcox et al.................. 219/110

Primary Examiner—J. V. Truhe
Assistant Examiner—J. G. Smith
Attorney—Smyth, Roston and Pavitt ABSTRACT: Spot welds are monitored for determining the quality of the weld by measuring the amount of shrinkage that occurs at the weld, beginning subsequently to the termination of the welding current. The amount of shrinkage is compared to the shrinkage of reference welds which are known to be satisfactory.

INVENTOR:
Klaus Herbst

ATTORNEYS

METHOD FOR SUPERVISING SPOT WELDING

The present invention relates to a method for supervising electric spot welding, particularly by monitoring the distance between the electrodes and providing comparison with reference data.

Spot welding is usually conducted by means of the following individual steps. At first the welding electrodes are placed in position to engage the workpieces to be welded and to apply pressure thereto. Next, electric current is applied and pressure is again applied by the electrodes to squeeze the workpiece together. Thereafter the pressure is released and the electrodes are removed. Particularly in case of mass production it is necessary to provide for running quality check and supervision to eliminate workpieces with defective spot welding from further processing.

It is known to monitor the displacement of the weld electrodes as resulting from thermal expansion of the material during heating thereof by welding current, and to record the displacement in an attempt to evaluate the weld so as to obtain best possible welded joints. In particular, the increase in distance between the electrode is measured, the increase resulting from thermal expansion of the workpieces during heating by the welding current.

Upon closely analyzing this method of supervision it must not be ignored that thermal expansion of the workpieces are linear with temperature, up to a particular temperature, provided the welding current is a continuous one. As the material is heated above softening point some of the material that has become liquidous is apt to spatter and the electrodes sink into the workpieces in spite of continued thermal expansion. As a consequence, the electrodes provide permanent indent which, to some extent, is characteristic for spot-welded products.

In many cases several spot weldings are made in more or less rapid sequence, for example, a row of joints involving the same workpieces is welded in the same run followed by a comparatively long interruption for exchange of workpieces. During the run, the electrodes are progressively heated and expand, but during the interruption they cool again so that the first weld thereafter operates with initially comparatively cool electrodes. Therefore, the thermal condition of the electrodes undergoes changes due to this lack in uniformity of operation so that electrode displacement differs for the several welds. Thermal expansion measured during initial weldings of a run are up to 50 percent above expansion measured during later weldings of the run. Additionally, the frequency of the welding current sets up vibrations in the electrode which are more or less unavoidable but lead to faulty measurement of thermal expansion of the workpieces.

In case electrode displacement is measured only during an initial heating phase, subsequent causes for defects, such as current interruption, globule sputtering etc. as they may occur particularly during later phases of the weld will be missed by such supervisory measurement restricted to the initial phase.

In case heating is produced by pulsating current flow thermal expansion is not uniform, and the known methods for obtaining supervision measurements are not applicable at all.

The problem solved by the invention is the avoidance of erroneous measurements of the known methods and to improve supervisory measurements as to quality check for spot welding. In particular, a method has been found that is *also* applicable to welding processes operating with intermittent current flow.

In accordance with the invention it is suggested to measure the shrinking of the joint of the welded workpieces during application of pressure but *after* termination of current flow. Thus, as the welding region cools, it shrinks and the shrinking is to be measured as representation of the quality of the joint, particularly by measuring the change in distance between the welding electrodes due to shrinking. The distance is suitably plotted on a chart or otherwise recorded and compared with reference curves. Reference charts may include limit curves delineating an area into which the plotted curve must fall in order to be regarded as representation of an acceptable weld.

In accordance with a modified version of the invention, but following the basic principle, shrinking of the welded workpieces is measured after termination of flow of welding current and after a predetermined period of pressure application; shrinking, of course, resulting also in this case from cooling of the workpieces and being ascertained through measurement of change in electrode distance. This measured value is compared with two limit values prepared for purposes of reference and defining a range within which the measured value must fall in order to represent an acceptable spot weld.

It will be appreciated, that supervisory measurement for obtaining critical values and data on the particular criterion, i.e. shrinking, commences only after supply of thermal energy (flow of the electric welding current) has terminated. Thus, it was found that quality supervision conducted by means of this particular type measurement provides representation of the quality of the weld regardless whether the heat for welding has developed by a pulsating, intermittent current or by a current flowing continuously for the welding period.

Shrinking of welded workpieces is a process that runs approximately linear. Another advantage of the invention is to be seen in the fact that the supervisory measurement is conducted when the machine is in fact at rest as far as current flow is concerned. Thus, vibrations of and in the welding machine during welding current flow have already decayed.

It can readily be seen that the supervisory measurement does not only ascertain defects in the welding joint, which may have been produced during the initial phase of welding current flow, but also those defects are detected that have arisen in later phases. Such defects may have resulted from escape of liquidous material due to sputtering as the welding current was too high or was flowing too long. Also, an incomplete weld may result from too short a duration of welding current flow. The inventive method avoids errors in the quality check resulting from compounding of thermal extension and of sinking of the electrodes into the softened material.

Figure 2:
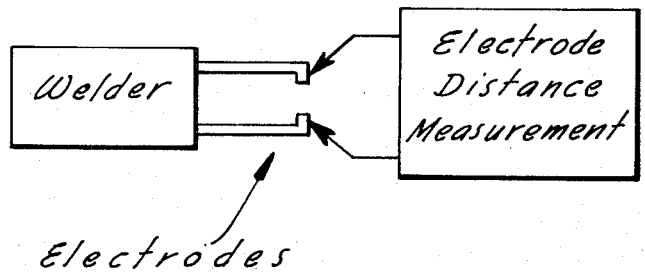

FIG. 1 is a flow chart of the inventive method; and
FIG. 2 is a block diagram of equipment used for practicing the inventive method.

Turning to the detailed description of the drawing, and as was outlined above, a welder in FIG. 2 has electrodes, and the displacement of these electrodes is used for determining shrinkage using electrode distance at the end of welding current flow as starting point for each measurement. As per FIG. 1 in preparation for the evaluation of a weld, test or reference welds are made under similar circumstances and particular characteristics of shrinking are plotted or otherwise recorded to obtain reference curves. These test and reference welds have been established otherwise, for example, through elaborate tests as constituting ideal or near-ideal spot welds in accordance with a chosen set of parameters. For example, the joints must meet minimum strength requirements and strength tests on the reference welds establish that they do, in fact, meet these requirements so that the data on shrinking derived therefrom pertain to welds that are satisfactory. Measurements on texture of the zone that was affected by the welding process may be required to sharpen the conditions establishing satisfactory welds. This way particular standards are set, and represented by data on shrinking as ascertained of these reference welds.

As now supervisory measurements are conducted a predetermined section of each resulting curve representing shrinking is referenced against the standard characteristics prepared as reference. If the particular section of the curve of the supervisory measurement as to shrinking falls in between predetermined limits as defined by the reference data, the weld is regarded as satisfactory, as it was found that in fact this kind of check on the spot weld guarantees adequacy thereof. If, however, the measured and plotted curve runs outside of the predetermined limits, the weld is regarded as faulty and the workpieces are eliminated.

It should be mentioned that the reference data to be used as representing shrinking of adequate and satisfactory welds may be represented as signals or other manifestations automatically referenced against the currently conducted measurement of shrinking likewise represented by signals. The result of automatic comparison and referencing may, in turn, be represented by by signals inhibiting or enabling means for eliminating faulty welded workpieces from the production line.

The invention is not limited to the embodiments described above but all changes and modifications thereof not constituting departures from the spirit and scope of the invention are intended to be included.

I claim:

1. Method for supervising quality of electric spot welding comprising:

measuring change in electrode distance, beginning subsequently to termination of welding current flow, in representation of shrinking of the workpiece due to cooling, during application of pressure by the electrodes for squeezing the workpieces;

providing reference representation of shrinking of other welding spots, after termination of welding current flow therein and satisfying particular parameters and determining a satisfactory weld; and comparing the measured shrinkage with the reference representation.

2. Method as in claim 1, the providing step including providing of characteristics representing shrinking and constituting representation of a range for satisfactory welds.

3. Method as in claim 1, the providing step including the providing of two limits delineating a range, the shrinking of a weld being measured after current flow termination, a particular time in the pressure application period, the measured shrinking to fall into the range.

* * * * *